US006928558B1

(12) United States Patent
Allahwerdi et al.

(10) Patent No.: US 6,928,558 B1
(45) Date of Patent: Aug. 9, 2005

(54) METHOD AND ARRANGEMENT FOR RELIABLY IDENTIFYING A USER IN A COMPUTER SYSTEM

(75) Inventors: Nouri Allahwerdi, Palo Alto, CA (US); Lassi Hippeläinen, Helsinki (FI)

(73) Assignee: Nokia Mobile Phones Ltd., Espoo (FI)

( * ) Notice: Subject to any disclaimer, the term of this patent is extended or adjusted under 35 U.S.C. 154(b) by 772 days.

(21) Appl. No.: 09/698,774

(22) Filed: Oct. 27, 2000

(30) Foreign Application Priority Data

Oct. 29, 1999 (FI) .............................................. 19992343

(51) Int. Cl.[7] .............................................. H04B 7/28
(52) U.S. Cl. .......................... 713/202; 713/172; 380/25
(58) Field of Search ................................ 713/202, 172, 713/168, 185, 200, 201; 380/25, 29, 255; 370/352, 389, 469; 455/567

(56) References Cited

U.S. PATENT DOCUMENTS

| 4,720,860 | A | | 1/1988 | Weiss .......................... 380/23 |
|---|---|---|---|---|
| 5,455,863 | A | | 10/1995 | Brown et al. .................. 380/23 |
| 5,491,752 | A | | 2/1996 | Kaufman et al. .............. 380/30 |
| 6,067,621 | A | * | 5/2000 | Yu et al. ....................... 713/172 |
| 6,466,571 | B1 | * | 10/2002 | Dynarski et al. ............. 370/352 |
| 6,490,687 | B1 | * | 12/2002 | Nagai ........................... 713/202 |
| 6,628,671 | B1 | * | 9/2003 | Dynarski et al. ............. 370/469 |

FOREIGN PATENT DOCUMENTS

| EP | 0636963 | 2/1995 |
|---|---|---|
| WO | WO 96/13920 | 5/1996 |
| WO | WO 98/47258 | 10/1998 |

OTHER PUBLICATIONS

"The GSM System for Mobile Communications", ISBN 2-9507190-0-7, Mouly et al., chapters 7.2.2.1. and 8.1.1.
U.S. Patent document No. 5,373,559. Text printout with drawing, pp. 1–14 text and 7 sheets of drawing.
US Patent document No. 5485519. Text printout with drawing, pp. 1–15 text and 5 sheets of drawing.
US Patent document No. 5657388. Text printout with drawing, pp. 1–9 text and 2 sheets of drawing.

* cited by examiner

*Primary Examiner*—Gregory Morse
*Assistant Examiner*—Ellen C Tran
(74) *Attorney, Agent, or Firm*—Perman & Green, LLP.

(57) ABSTRACT

The invention relates to an arrangement and a method for reliably identifying a user in a computer system. The method utilizes a mobile station for communicating with the system. The method comprises generating a first one-time password in the mobile station by utilizing a known algorithm on the basis of the identification number of the user, subscriber-specific identifier, device-specific identifier of the mobile station, and time. The password obtained and the subscriber-specific identifier of the user are encoded and transmitted to an authentication server of the computer system, comprising identifying the user on the basis of the subscriber-specific identifier, searching a database for the personal identifier number of the user and the device-specific identifier of the mobile station associated with the user, generating a second password at the authentication server by utilizing the same predetermined algorithm on the basis of the personal identification number of the user, subscriber-specific identifier, device-specific identifier of the mobile station and time, comparing the first and the second passwords with each other at the authentication server, and if the passwords match, enabling the telecommunication connection between the mobile station and the computer system.

19 Claims, 4 Drawing Sheets

METHOD AND ARRANGEMENT FOR RELIABLY IDENTIFYING A USER IN A COMPUTER SYSTEM

FIELD OF THE INVENTION

The invention relates to a method and arrangement for reliably identifying a user in a computer system. The invention particularly relates to a solution wherein a connection to a computer system is implemented by a mobile station, preferably a mobile station in a mobile telephone system.

BACKGROUND OF THE INVENTION

Most computer systems have been designed such that users have to log into a system from their own workstation by using their unique user name and password. A server of the system, typically an authentication server, checks whether such a user name has been defined among the users of the system and whether a given password corresponds with said user name. If so, the user is allowed to access the system; otherwise no access is allowed. This is to guarantee that the system is secure, i.e. to prevent unauthorized users from accessing the system. When the workstations have a fixed connection to the computer system through, for example, integrated cabling, this method of identifying users usually suffices.

Nowadays, however, remote connections are often needed in a computer system. This means that the user's workstation does not have a fixed connection to the computer system but the connection is established through a public network, typically a telephone network. Through a modem, for example, the workstation is connected to the telephone network, through which a telephone connection is established to the system through a modem series of the system. In such a case, much more is required of the identification of the user because the connection is established through a public telephone network whose security cannot be controlled by the system administrator. Identifying users on the basis of user names and passwords in a connection established over a public network is dubious since unauthorized access to the system then becomes possible by e.g. guessing the user names and passwords. User names are often formed from the names of the users, and if the users themselves may choose their passwords, they are quite often easy to infer or guess.

The connections between a terminal and a computer system are often implemented by using a protocol called a PPP (Point-to-Point) protocol. PPP connections often utilize methods called a CHAP (Challenge-Handshake Authentication Protocol) method or a PAP (Password Authentication Protocol) method. In the PAP method, a password is transferred over a transmission path unencrypted, so the protection it provides is quite weak. The CHAP method utilizes an encrypted password. In the method, the same algorithm is applied at both ends of the transmission path. The network transmits a random number to the terminal, which computes a secret value on the basis of the number, user name and password by utilizing the algorithm. The secret value, password and user name are transmitted to the network, which computes a password from the secret value and compares it with the transmitted password.

It is further known to use a method called a RADIUS (Remote Authentication Dial In User Service Protocol, RFC 2138) method when a user logs in.

Various methods have also been developed for enhancing the reliability and security in identifying a user of a computer system. Since passwords defined by the user are often easy to crack, the prior art solutions utilize one-time passwords. Hence, each password is only used once when the user logs in, and even if a third party were to crack the password, it would be of no use since another password would be used the next time. In this method, both the user and the authentication server of the computer system must have corresponding password lists available. The user may have the password list written on paper, for example, or alternatively, a separate device called a trusted device may be used to generate one-time passwords.

U.S. Pat. No. 5,485,519 discloses a method wherein a user has a separate device to generate a password. The user enters a predetermined password into the device, which forms from the password and encrypted bit sequence programmed into the device a password to be used on the connection. This password is encrypted and stored in the device to be used for generating the next password. In the solution of the publication, the password generated by the device has to be inputted into a processor apparatus establishing the connection, such as a computer, for example, through a magnetic tape reader or diskette drive.

U.S. Pat. No. 4,720,860 discloses a solution utilizing one-time passwords wherein a user has a separate device, e.g. a card of the smart card type, which generates a one-time password to be read by the user from the display of the device and entered by the user into a computer operating as a means of communication. The device generates a one-time code on the basis of a fixed code and a varying parameter, such as time. The fixed code is programmed in the device. It is also feasible that the fixed code is inputted into the device. The authentication server of the computer system calculates a second identification number by utilizing the same parameters, and if the identification numbers match, the connection is allowed and feasible.

U.S. Pat. Nos. 5,657,388, 5,373,559 and 5,491,752 disclose another solution utilizing one-time passwords wherein a user has a simple, separate device called a token, such as a memory card, for example, with a secret code stored therein. A means of communication, a portable computer, for example, reads the secret code from the memory of the card. The user enters his or her personal password into the communication means, which generates a one-time password on the basis of the secret code, password and time, and which then transmits the generated password to the authentication server of the computer system.

In all prior art solutions described above, the user has to carry with him several devices, i.e. a separate password generator, typically a card of the smart card type, and the actual communication means for establishing a connection to the desired computer system. Furthermore, in all known solutions, the user has to actively either enter the one-time password read from the smart card into the communication means or alternatively, supply the entire card into the communication means, thus enabling the data in the card to be read.

BRIEF DESCRIPTION OF THE INVENTION

An object of the invention is thus to provide a method and an arrangement implementing the method such that a user can be identified in a reliable manner without, however, causing any trouble or inconvenience to the user. This is achieved by a method of reliably identifying a user in a computer system, in which method a mobile station is used for communicating with the computer system and a personal identification number is supplied into the mobile station.

The method of the invention comprises generating a first one-time password in the mobile station without any action by the user by utilizing a known algorithm on the basis of a personal identification number of the user, subscriber-specific identifier read from a subscriber-specific identification module of the mobile station, device-specific identifier of the mobile station and time, encoding the first one-time password and the subscriber-specific identifier of the user at the mobile station, transmitting the encoded password and subscriber-specific identifier to an authentication server of the computer system, identifying the user at the authentication server on the basis of the subscriber-specific identifier, and searching a database for the personal identifier number of the user and the device-specific identifier of the mobile station associated with the user, generating a second one-time password at the authentication server by utilizing the predetermined algorithm on the basis of the personal identification number of the user, subscriber-specific identifier, device-specific identifier of the mobile station and time, comparing the first password and the second password with each other at the authentication server, and if the passwords match, enabling the telecommunication connection between the mobile station of the user and the computer system.

The invention further relates to an arrangement for reliably identifying a user in a computer system, which arrangement comprises a mobile station used for communicating with the computer system, the mobile station comprising a subscriber-specific identification module comprising a subscriber-specific identifier, a device-specific identifier permanently encoded in the mobile station, means for reading a personal identifier number which is supplied by the user and which enables the device to be used, means for checking the correctness of the identifier number always before the device is put to use, and which arrangement comprises an authentication server comprising memory means for storing the user names of the users in the system and the corresponding personal identifiers and device-specific identifiers.

In the arrangement of the invention, the mobile station comprises means for generating a first one-time password without any action by the user by utilizing a known algorithm on the basis of the personal identification number of the user, subscriber-specific identifier read from a subscriber-specific identification module of the mobile station, device-specific Identifier of the mobile station and time, means for encoding the first one-time password and the subscriber-specific identifier of the user, means for transmitting the encoded password and subscriber-specific identifier to an authentication server of the computer system, and the authentication server is arranged to identify the user on the basis of the subscriber-specific identifier, and search a database for the personal identifier number of the user and the device-specific identifier of the mobile station associated with the user, generate a second one-time password by utilizing the predetermined algorithm on the basis of the personal identification number of the user, subscriber-specific identifier, device-specific identifier of the mobile station and time, compare the first password and the second password with each other, and if the passwords match, enable the telecommunication connection between the mobile station of the user and the computer system.

The idea underlying the invention is that the mobile station itself is a "trusted device", which means that the user does not need any separate devices to carry with him when the user desires to establish a secure connection to the computer system. The solution of the invention also enables connection setup to be automatized without the security being disturbed.

In the solution of the invention, the mobile station, which establishes a connection to the computer system, thus itself generates the necessary one-time password. The password is generated by utilizing a predetermined algorithm having time, subscriber identifier of the user, device identifier of the mobile station and the PIN code of the user as its parameters.

Several advantages are achieved by the method and arrangement of the invention. A drawback of the previous solutions, i.e. the use of two separate devices, can be avoided. Further, the connection setup process itself is quicker since at this stage the user does not have to enter passwords into the device; external peripherals are also unnecessary. The solution of the invention also provides strict data security since a potential intruder will not benefit from intercepting the algorithms or programs used. Copied programs do not function in a foreign device even if the password of the user, or PIN, had been cracked.

BRIEF DESCRIPTION OF THE DRAWINGS

The invention is now described in closer detail in connection with the preferred embodiments and with reference to the accompanying drawings, in which.

DETAILED DESCRIPTION OF THE INVENTION

Figure 1:
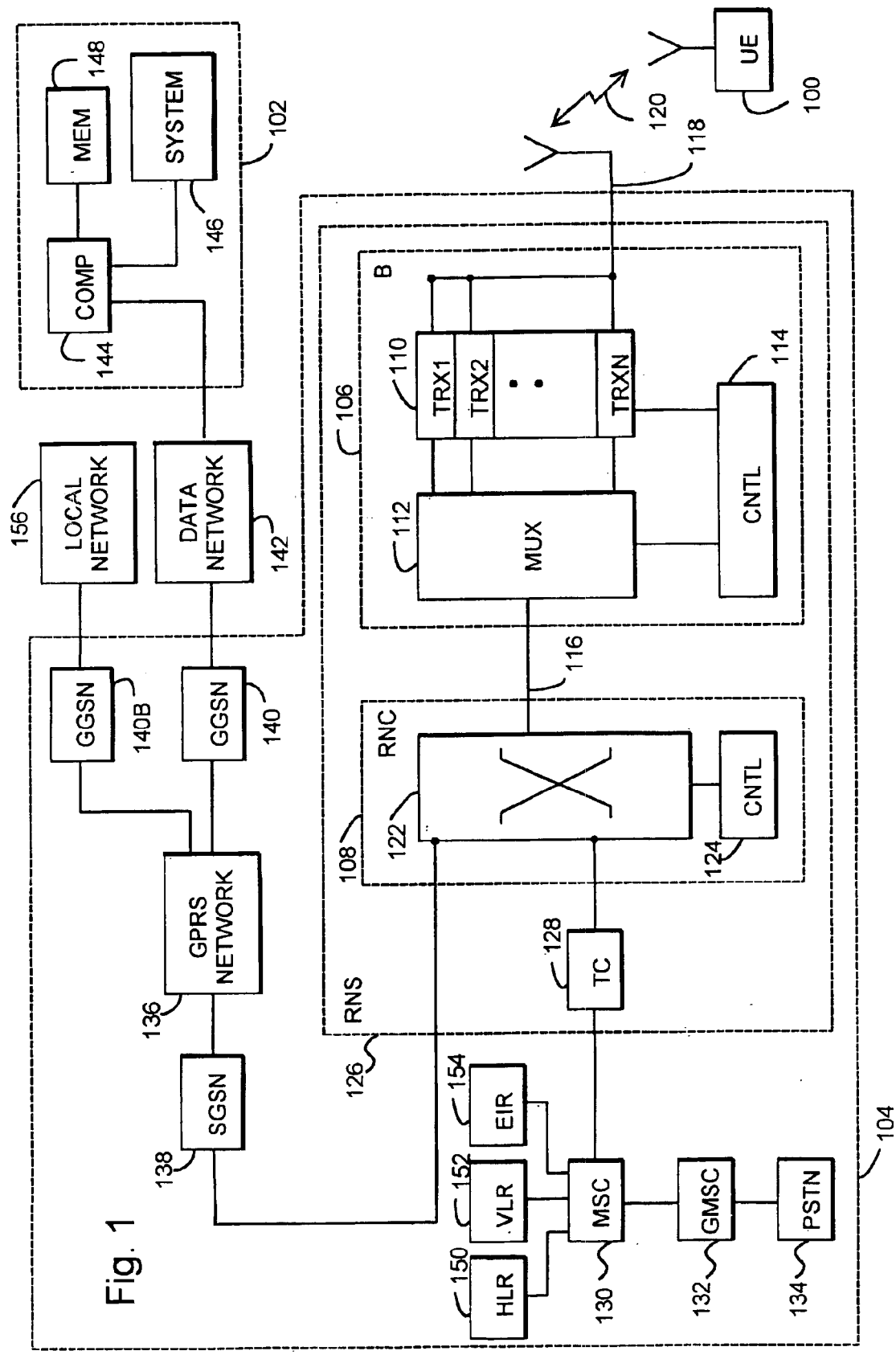
FIG. 1 shows an example of a system whereto a solution of the invention can be applied.
Figure 2A:
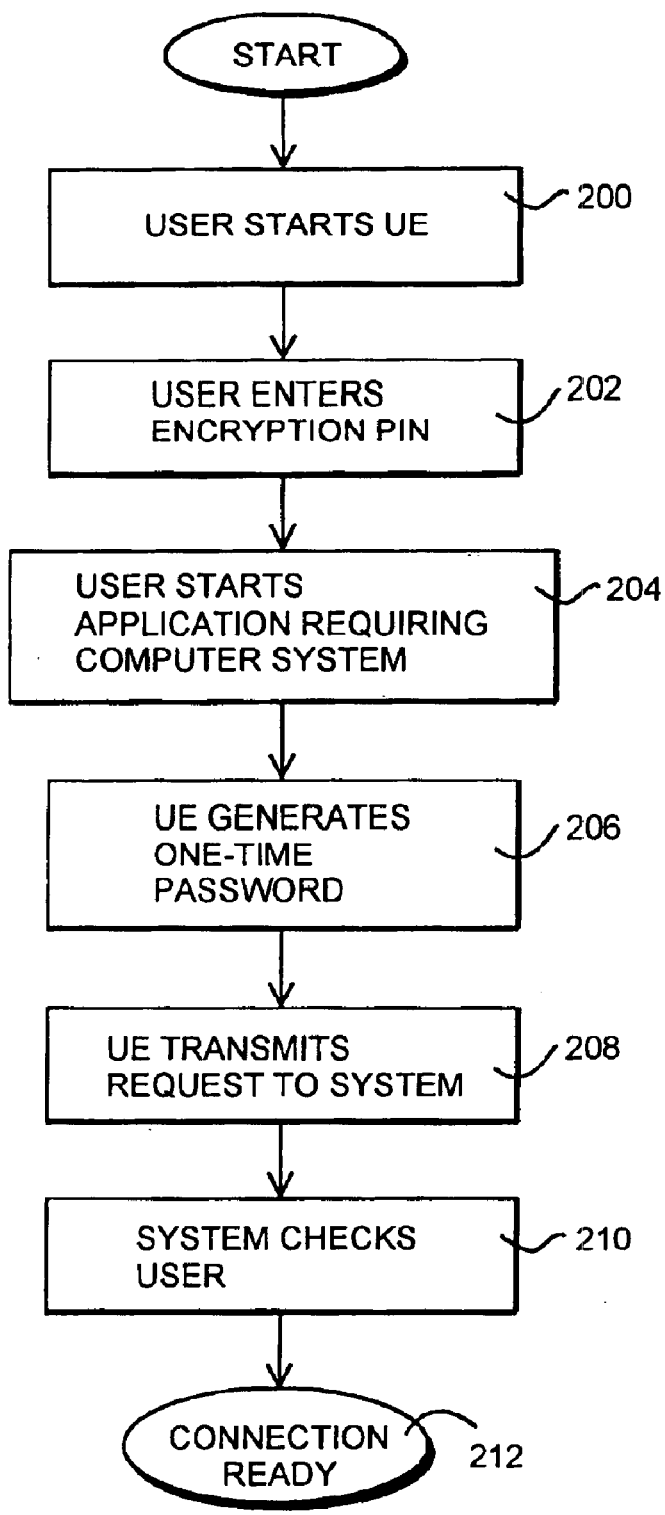
FIGS. 2a and 2b are flow diagrams illustrating a method of the invention.
Figure 2B:
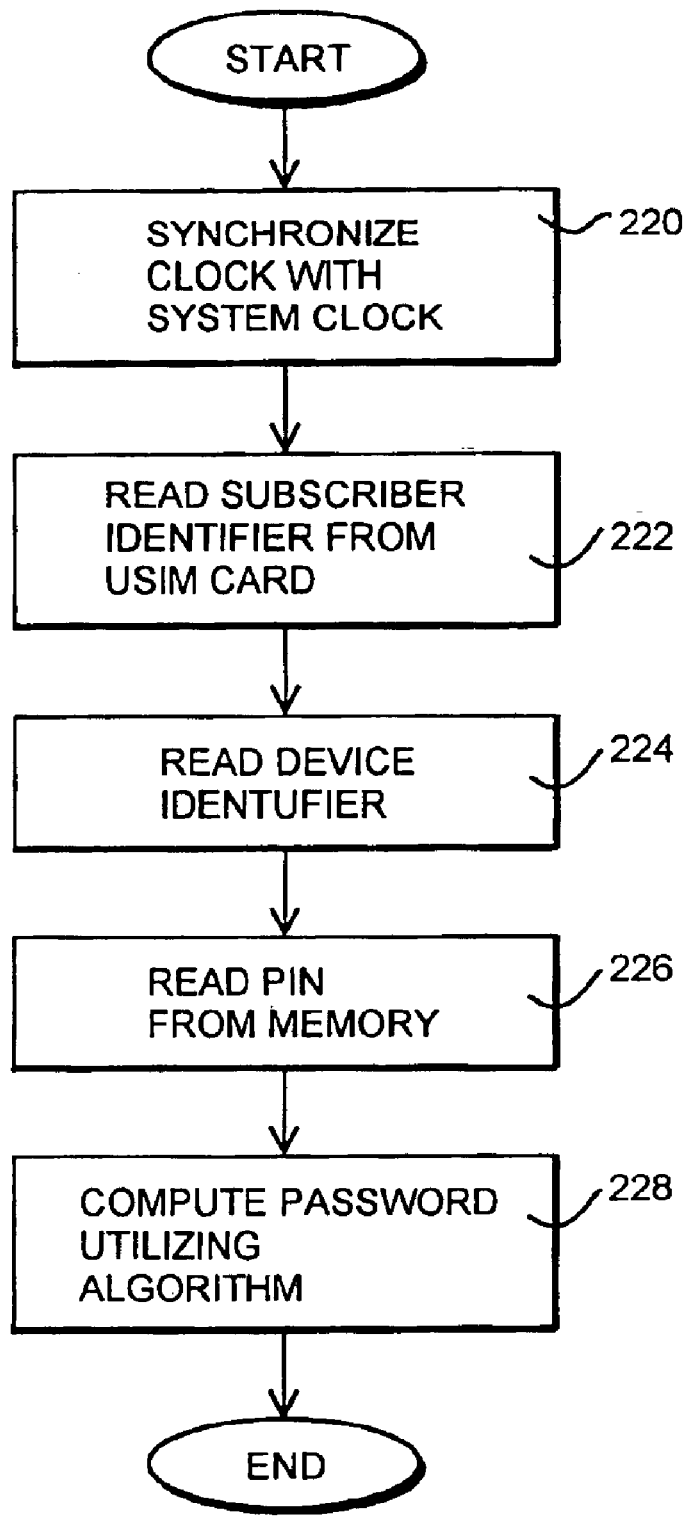

Referring to FIG. 1, examine an example of a system whereto a solution of the invention can be applied. In the solution of the invention, a user is in the possession of a mobile station 100, which is used for communicating with a desired computer system 102. FIG. 1 only shows an example of a radio system of the invention. The details of the structure of the radio system and the connection to the computer system per se may also be implemented differently as long as the characteristics of the invention are taken into account. The solution of the invention is thus not restricted to a GPRS system only although such a system has been used as the example in FIG. 1.

A radio network typically comprises a fixed network infrastructure, i.e. a network part 104, and subscriber terminals 100, which may be fixedly located, vehicle-mounted or portable terminals to be carried around. The network part 104 comprises base stations 106. A plurality of base stations 106 are, in turn, controlled in a centralized manner by a radio network controller 108 communicating with them. A base station 106 comprises transceivers 110 and a multiplexer unit 112.

The base station 106 further comprises a control unit 114, which controls the operation of the transceivers 110 and the multiplexer 112. The multiplexer 112 arranges the traffic and control channels used by several transceivers 110 to a single transmission connection 116.

The transceivers 110 of the base station 106 are connected to an antenna unit 118, which is used for implementing a bi-directional radio connection 120 to a subscriber terminal 100. The structure of the frames to be transmitted in the bi-directional radio connection 120 is defined system-specifically, and the connection is called an air interface.

The radio network controller 108 comprises a group switching field 122 and a control unit 124. The group switching field 124 is used for connecting speech and data and for combining signaling circuits. The base station 106 and the radio network controller 108 form a radio network subsystem 126, which further comprises a transcoder 128. The transcoder 128 is usually located as close to a mobile services switching center 130 as possible since speech can then be transferred in a cellular radio network form between the transcoder 128 and the radio network controller 108 by using as little transmission capacity as possible.

The transcoder 128 converts the different digital speech coding forms used between a public switched telephone network and a mobile telephone network into compatible ones, for instance from a fixed network form to another cellular radio network form, and vice versa. The control unit 124 performs call control, mobility management, collection of statistical data and signaling.

FIG. 1 further shows the mobile services switching center 130 and a gateway mobile services switching center 132, which is responsible for the connections from the mobile telephone system to the outside world, in this case to a public switched telephone network 134. The mobile telephone system also comprises various databases that maintain various information in order to maintain the functionality of the system. Such a register is an HLR (Home Location Register) 150, which comprises information associated with the subscribers in the system. The HLR maintains, for example, information on the whereabouts of a subscriber at a given time. The system further comprises a logically MSC-specific VLR (Visitor Location Register) 152, which maintains information on users located within the area of a given MCS at a given time, and information on the location of the users in a more specific manner than the HLR. Furthermore, the system comprises an EIR (Equipment Identity Register) 154, which maintains information on the terminals in the system. Each terminal typically comprises a device-specific device identifier, e.g. an IMEI (International Mobile Equipment Identifier), attached to the terminal already when the device was being manufactured, on the basis of which each terminal can be identified individually. The EIR maintains information on the device identifiers.

As can be seen from FIG. 1, the group switching field 122 can be used for establishing connections both to the PSTN (Public Switched Telephone Network) 134 through the mobile services switching center 130 and to a packet transmission network 136.

The connection between the packet transmission network 136 and the group switching field 122 is established by an SGSN (Serving GPRS Support Node) 138. The SGSN 138 is responsible for transferring packets between the base station system and a GGSN (Gateway GPRS Support Node) 140, and for keeping a record of the location of the subscriber terminal 100 in its area. The SGSN 138 may also communicate with databases 150 to 154 of the mobile telephone system either through the MSC 130 or directly.

The GGSN 140 combines a public packet transmission network 142 and the packet transmission network 132. An Internet protocol or X.25 protocol can be used on the interface. By encapsulation, the GGSN 140 hides the internal structure of the packet transmission network 136 from the public packet transmission network 142, so for the public packet transmission network 142, the packet transmission network 136 resembles a sub-network, the public packet transmission network being able to address packets to the subscriber terminal 100 located therein and to receive packets therefrom.

The packet transmission network 136 is typically a network utilizing the Internet protocol of the radio network operator and carrying signaling and tunnelled user data. As regards the architecture and protocols below the Internet protocol layer, the structure of the network 136 may vary operator-specifically.

The public packet transmission network 142 may be the global Internet, for example, to which the computer system 102 is connected.

The computer system 102 typically comprises an authentication server 144, which is responsible for authenticating users trying to access the system and allowing authorized users to access the rest of the system 146. The authentication server 144 is not necessarily a separate apparatus but it can also be implemented by software as a part of a computer. The authentication server also comprises a memory 148, in which the user names of the users in the system and the corresponding personal identifiers and device-specific identifiers have been stored. The memory can be implemented as a fixed part of the normal server equipment or as separate database equipment. The rest of the system 146 typically comprises one or more computer hardware configurations, which provide e-mail or database services and corresponding company network solutions.

A connection can be established to another data network 156, preferably a local network, such as a company intranet, through a second GGSN 140b. In the solution of the invention, a connection to a desired network requiring authentication can thus be established in many ways.

The present invention thus particularly relates to reliably identifying a user while establishing a connection to a computer system. Although the identification must be reliable, it is also desirable that the identification procedure can be implemented smoothly as far as the user is concerned.

Examine an example of the solution of the invention by means of flow diagrams 2a and 2b. In step 200, a user switches on a mobile station. Typically, the mobile station is at this stage set to request the user to enter a password, i.e. PIN (Personal Identification Number), which enables the mobile station to be used. In step 202, the user enters the password into the mobile station. The mobile station can then also be used as a common telephone, but when the user in step 204 starts an application requiring a predetermined computer system, such as an e-mail program, the mobile station then, in the solution of the invention, generates a one-time password in step 206. This step will be described later in closer detail.

If the mobile station is not to be used for communication that requires encryption, the user can enter another predetermined password, i.e. PIN, into the mobile station while switching on the device. In a preferred embodiment of the invention, the user thus has at least two different passwords, and some of these passwords enable applications requiring encryption to be used while some do not. Hence, the mobile station can be safely used and, if desired, also lent to a second party unequipped to use applications requiring encryption.

Next, the mobile station typically encodes the generated password and the user name of the user in an appropriate manner and transmits a message to the computer system in step 208. The computer system receives the message, and in step 210, itself generates a corresponding one-time password and compares the passwords, and if the passwords match, grants access to the information in the system, and the connection can continue in step 212. If the passwords do not match, the system does not, in the preferred embodiment of the invention, transmit any response to the mobile station. This enhances security since a potential intruder will not find out why the connection failed.

The password and the user name can be transmitted to the computer system appropriately encrypted, either by using encryption specific to the radio system or unique encryption enhancing security, which can be decrypted by the receiving end. These steps can be implemented in ways known to one skilled in the art.

The generation of passwords is illustrated in closer detail in diagram 2*b*. In step 220, the mobile station synchronizes its internal clock with the system clock. The synchronization can be carried out by utilizing the known synchronization methods. The synchronization is to make sure that the mobile station and the system use the same time parameter in generating the passwords. In step 222, an "A subscriber identifier" A_SCRBR is read from a subscriber-specific identification module of the mobile station, such as an SIM/USIM ([Universal] Subscriber Identity Module) card, or the like.

In step 224, the device identifier of the mobile station is read. In the solution of the invention, each mobile station has a device-specific device identifier, e.g. an IMEI (International Mobile Equipment Identifier), attached to the mobile station when the mobile station was being manufactured, on the basis of which each mobile station can be identified individually. In the GSM system, for example, the IMEI identifier comprises the following fields:

TAC type approval code,
FAC final assembly code,
SNR serial number, and
SVN software version number.

In step 226, the personal identifier number, or PIN, supplied by the user is read from the memory.

Using the aforementioned values (personal identification number, or PIN, of the user, subscriber-specific identifier A_SCRBR, device-specific identifier IMEI of the mobile station and time), the mobile station computes a one-time password by applying a predetermined algorithm. The predetermined algorithm can be fixedly programmed in the mobile station, or alternatively, it can be changeable, for example downloadable from the computer system.

In addition to the aforementioned values, it is also feasible to use numbers stored in the memory of the mobile station as an algorithm parameter. For example, a set of prime numbers can be downloaded from the computer system in table form. The same table is also known to the authentication server.

The mobile station can also be lent to another user if the PIN of the mobile station is changed, because it is then impossible to establish a connection to the computer system. The terminal can then either completely prevent the identification procedure from starting or the terminal can allow the identification procedure; in such a case, connection setup always fails anyway because of an incorrect PIN. Similarly, connection setup can be prevented also by changing the SIM card.

The characteristics of the invention can be implemented both in the mobile station and the computer system preferably by software. Examine next an example of the structure of a mobile station by means of FIG. 3.

Figure 3:
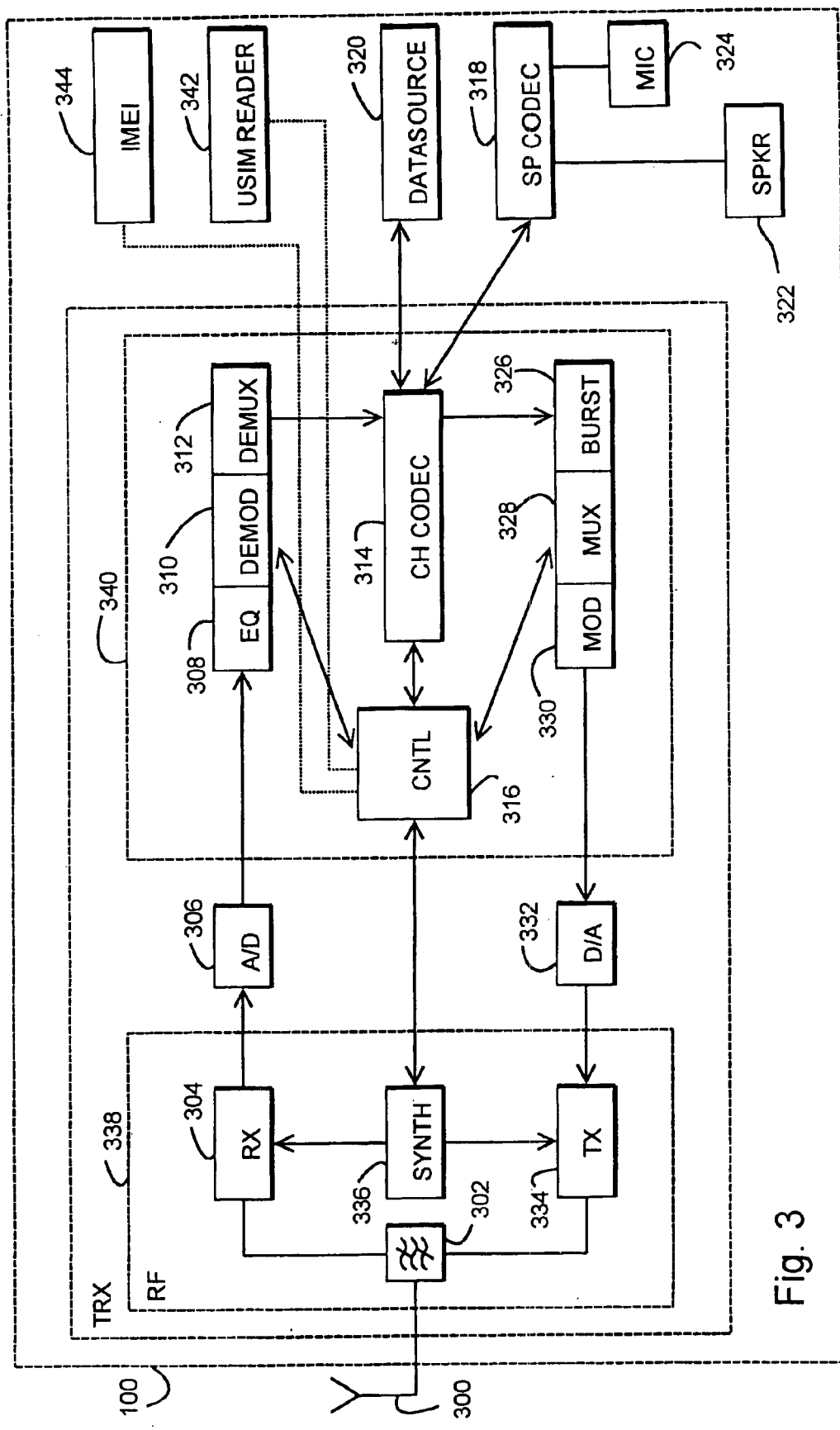
FIG. 3 illustrates an example of the structure of a mobile station of the invention.

FIG. 3 shows an example of the structure of a mobile station 100. The mobile station comprises an antenna 300, which is used for transmitting and receiving signals. Examine first the receiver section. A signal received by the antenna 300 is supplied through a duplex filter 302 to a radio frequency receiver 304. The duplex filter separates the transmitting and receiving frequencies from each other. The radio frequency receiver 304 comprises a filter to block frequencies outside the desired frequency band. Next, the signal is converted to intermediate frequency or directly to baseband, and the baseband signal is sampled and quantized at an analogue/digital converter 306. An equalizer 308 compensates for interference caused by multipath propagation, for example. From the equalized signal, a demodulator 310 takes a bit stream, which is transmitted to a demultiplexer 312. The demultiplexer 312 separates the bit stream from different time slots into separate logical channels. A channel codec 314 decodes the bit streams of the separate logical channels, i.e. decides whether a bit stream is signaling data, which is transmitted to a control unit 316, or whether the bit stream is speech, which is transmitted to a speech codec 318, or data, which is transmitted to a data unit 320, for example. The data unit can be, for example, a display of the mobile station or a data processing unit, peripheral or the like. From the speech codec 318, a speech signal is forwarded to a loudspeaker 322. The channel codec 314 also performs error correction. The control unit 316 performs internal control functions by controlling the different units.

In the transmitter section, the channel codec 314 receives the signal to be transmitted either from the data unit 320 or the speech codec 318. The speech codec receives the signal from a microphone 324. The data unit may be, for example, a keypad or a touch-sensitive display or a peripheral of the mobile station. A burst generator 326 adds a training sequence and a tail to the data supplied from the channel codec 314. A multiplexer 328 assigns a time slot to each burst. A modulator 330 modulates digital signals to a radio frequency carrier. This is an analogue operation, therefore a digital/analogue converter 332 is needed for performing it. A transmitter 334 comprises a filter to restrict the bandwidth. In addition, the transmitter 334 controls the output power of a transmission. A synthesizer 336 arranges the necessary frequencies for the different units. The synthesizer 336 generates the necessary frequencies by using a voltage controlled oscillator, for example.

In a manner shown in FIG. 3, the structure of the transceiver can be further divided into radio frequency parts 338 and a digital signal processor including software 340. The radio frequency parts 338 comprise the duplex filter 302, receiver 304, transmitter 334 and synthesizer 336. The digital signal processor including the software 340 comprises the equalizer 308, demodulator 310, demultiplexer 312, channel codec 314, control unit 316, burst generator 326, multiplexer 328 and modulator 330. The analogue/digital converter 306 is needed for converting an analogue radio signal to a digital one and, correspondingly, the digital/analogue converter 332 for converting a digital signal to an analogue one.

The mobile station further comprises a subscriber-specific reader 342 of the identification module, typically a SIM/USIM card reader or the like. When the mobile station is being switched on, the control unit 316 of the mobile station checks whether a card is inserted in the reader, and reads the user identification data from the card. When the mobile station was being manufactured, a device-specific identifier IMEI, which is readable by the control unit 316, was also stored in the mobile station in a memory element 344. The device-specific identifier is fixedly stored in a memory circuit and cannot be easily changed.

Naturally, the device of the invention may comprise different user interface parts, such as a display and a keypad, but these parts are not described in closer detail here.

The functions of the invention can thus be implemented in the mobile station preferably by software. Software comprising the necessary functional commands can be located in connection with the control unit 316. The software may naturally have a modular structure, i.e. it may comprise several separate programs that can be updated separately from, for example, the computer system or the radio network operator.

The solution of the invention can also be applied to mobile stations which are equipped with more than one SIM/USIM card. Such mobile stations include, for example, telephones that enable "pre-paid" SIM/USIM cards to be used. Such a mobile station enables a solution wherein only one card is used for establishing a connection. In an embodiment of the invention, some of the information necessary for encryption is obtained from the card which is not used in establishing the connection.

Examine next another preferred embodiment of the invention. When a connection is being established in the GSM and GPRS systems, for example, both the terminal and the network know an "SRES" (Signed RESult) field. The field is also called an XRES. The field is typically 32 to 128 bits long. In connection with connection setup, the SRES is specified by both parties to the connection by utilizing the particular common parameters and the same algorithm. In a prior art solution, the SRES is transmitted from the terminal to the network wherein the computed number is compared with the number computed in the network. Further information on the SRES field can be found in M. Mouly, M. P. Pautet: *The GSM System for Mobile Communications*. ISBN 2-9507190-0-7, chapter 7.2.2.1, for example, which is incorporated herein by reference.

In the present embodiment of the invention, instead of the SRES only, the terminal transmits information that may comprise fields:

SRES signed result,

TIME time information,

IMSI internation number of the terminal, and

IMEI device number of the terminal.

Compared with the prior art, an advantage of this embodiment is, naturally, enhanced protection since it is both time- and device-specific. In GSM-based systems, the international number IMSI of the terminal comprises a national code, operator code and actual telephone number of the terminal.

Examine next another preferred embodiment of the invention. When the RADIUS protocol is used in connection with the PPP/CHAP method, the authentication server receives fields "chap challenge", "user name" and "chap response" from the terminal. The authentication server compares the "chap response" generated by itself with the one received from the terminal. In a solution of the present embodiment of the invention, the fields have values:

"chap challenge" SRES,

"user name" user name to the system, and

"chap response" word formed from the values IMSI, IMEI, PIN, time, SRES.

Since the fields include the user name in plain text, the authentication server is thus able to quickly select from its own database the other information and generate a time-dependent, local "chap response", which thus has to correspond with the one received from the terminal.

Furthermore, in another preferred embodiment of the invention, a modified PPP/PAP method is utilized in connection with the RADIUS protocol. In the PPP/PAP method, the user name and password were originally transmitted unencrypted over the transmission path, in which case protection was weak. In the solution of the invention, an encrypted identifier based on the values IMSI, IMEI, PIN, time, SRES and generated according to the invention is thus transmitted in the field reserved for the user name. The SRES is transmitted in the field reserved for the password. Further, the user name to the system is transmitted in the "calling station id" field. This is to enable the authentication server to identify the caller without going through all potential users. When the RADIUS method is used, the field reserved for the password (in which the SRES is now transmitted) can be protected by using the common key of the GGSN and a company network. In a solution of the present embodiment of the invention, the fields thus have values:

"user name" word formed from the values IMSI, IMEI, PIN, time, SRES,

"user password" SRES, and

"calling station id" user name to the system.

In a preferred embodiment of the invention, in the alternatives described above the user name to the system is the same as the user's telephone number in the ISDN form, i.e. a number called an MSISDN. Further information on this can be found in M. Mouty, M. P. Pautet: *The GSM System for Mobile Communications*. ISBN 2-9507190-0-7, chapter 8.1.1., for example, which is incorporated herein by reference.

Although the invention has been described above with reference to the example according to the accompanying drawings, it is obvious that the invention is not restricted thereto but can be modified in many ways within the scope of the inventive idea disclosed in the attached claims.

What is claimed is:

1. A method of reliably identifying a user in a computer system, in which method a mobile station is used for communicating with the computer system and a persona identification number is supplied into the mobile station, the method comprising the steps of:

generating a first one-time password in the mobile station without any action by the user by utilizing a known algorithm on the basis of a personal identification number of the user, the personal identification number supplied into the mobile station enables the user to use the mobile station, subscriber-specific identifier read from a subscriber-specific identification module of the mobile station, device-specific identifier of the mobile station and time, encoding the first one-time password and the subscriber-specific identifier of the user at the mobile station, transmitting the encoded password and subscriber-specific identifier to an authentication server of the computer system, identifying the user at the authentication server on the basis of the subscriber-specific identifier, and searching a database for the personal identifier number of the user and the device-specific identifier of the mobile station associated with the user, generating a second one-time password at the authentication server by utilizing the predetermined algorithm on the basis of the personal identification number of the user, subscriber-specific identifier, device-specific identifier of the mobile station and time, comparing the first password and the second password with each other at the authentication server, and if the passwords match, enabling the telecommunication connection between the mobile station of the user and the computer system.

2. A method as claimed in claim 1, wherein the mobile station synchronizes the timing of the mobile station with the timing of the authentication server before the identification procedure is started.

3. A method as claimed in claim 1, wherein the user is identified automatically when the user starts an application utilizing the computer system in the mobile station.

4. A method as claimed in claim 1, wherein the authentication server transmits no information to the mobile station if the first and the second passwords do not match.

5. A method as claimed in claim 1, wherein during the identification, the terminal transmits to the authentication server a message comprising at least a field comprising a SRES value, a field comprising time, a field comprising an international telephone number of the terminal, and a field comprising a device number of the terminal.

6. A method as claimed in claim 1, wherein during the identification, a PPP/CHAP protocol is used in connection with a RADIUS protocol, and the terminal transmits to the authentication server a message comprising at least a field comprising a SRES value, a field comprising a user name to the system, and a field comprising a password generated from a device identifier, subscriber-specific identifier of the user, personal identification number of the user, time and the SRES value.

7. A method as claimed in claim 1, wherein during the identification, a PPP/PAP protocol is used in connection with the RADIUS protocol, and the terminal transmits to the authentication server a message comprising at least a field comprising a password generated from the device identifier, subscriber-specific identifier of the user, personal identification number of the user, time, and SRES value, a field comprising a SRES value, and a field comprising a user number to the system.

8. A method as claimed in claim 1, wherein information necessary for encryption is stored in the terminal in more than one subscriber-specific identification module.

9. A method as claimed in claim 6, wherein the user name to the system is the user's MSISDN.

10. An arrangement for reliably identifying a user in a compute system, which arrangement comprises
a mobile station used for communicating with the computer system, the mobile station comprising
a subscriber-specific identification module comprising a subscriber-specific identifier,
a device-specific identifier permanently encoded in the mobile station,
means for reading a personal identifier number which is supplied by the user and which enables the device to be used,
means for checking the correctness of the identifier number always before the device is put to use, and
which arrangement comprises an authentication server comprising
memory means for storing the user names of the users in the system and the corresponding personal identifiers and device-specific identifiers,
the mobile station further comprising
means for generating a first one-time password without any action by the user by utilizing a known algorithm on the basis of the personal identification number of the user, subscriber-specific identifier read from a subscriber-specific identification module of the mobile station, device-specific identifier of the mobile station and time,
means for encoding the first one-time password and the subscriber-specific identifier of the user,
means for transmitting the encoded password and subscriber-specific identifier to an authentication server of the computer system, and the authentication server is further arranged to
identify the user on the basis of the subscriber-specific identifier, and search a database for the personal identifier number of the user and the device-specific identifier of the mobile station associated with the user,
generate a second one-time password at the authentication server by utilizing the predetermined algorithm on the basis of the personal identification number of the user, subscriber-specific identifier, device-specific identifier of the mobile station and time,
compare the first password and the second password with each other at the authentication server, and if the passwords match, enable the telecommunication connection between the mobile station of the user and the computer system.

11. An arrangement as claimed in claim 10, wherein the mobile station is arranged to synchronize the timing of the mobile station with the timing of the timing authentication server before the identification procedure is started.

12. An arrangement as claimed in claim 10, wherein the mobile station is arranged to identify the user automatically when the user starts an application utilizing the computer system in the mobile station.

13. An arrangement as claimed in claim 10, wherein the authentication server is arranged not to transmit any information to the mobile station if the first and the second passwords do not match.

14. An arrangement as claimed in claim 10, wherein the mobile station is arranged to transmit to the authentication server a message comprising at least a field comprising a SRES value, a field comprising time, a field comprising an international telephone number of the terminal, and a field comprising a device number of the terminal.

15. An arrangement as claimed in claim 10, wherein the mobile station and the authentication server are arranged to use a PPP/CHAP protocol in connection with a RADIUS protocol during the identification, and the terminal is arranged to transmit to the authentication server a message comprising at least a field comprising a SRES value, a field comprising a user name to the system, and a field comprising a password generated from a device identifier, subscriber-specific identifier of the user, personal identification number of the user, time and the SRES value.

16. An arrangement as claimed in claim 10, wherein the mobile station and the authentication server are arranged to use a PPP/PAP protocol in connection with the RADIUS protocol during the identification, and the mobile station is arranged to transmit to the authentication server a message comprising at least a field comprising a password generated from the device identifier, subscriber-specific identifier of the user, personal identification number of the user, time, and SRES value, a field comprising a SRES value, and a field comprising a user number to the system.

17. An arrangement as claimed in claim 15, wherein the user name to the system is the user's MSISDN.

18. An arrangement as claimed in claim 10, wherein the mobile station is a GPRS system mobile station.

19. An arrangement as claimed in claim 10, wherein the mobile station comprises more than one subscriber-specific identification module, and information necessary for encryption is stored in more than one identification module.

* * * * *